United States Patent [19]

Negus et al.

[11] Patent Number: 5,164,946
[45] Date of Patent: Nov. 17, 1992

[54] BIREFRINGENT FILTER FOR USE IN A TUNABLE PULSED LASER CAVITY

[75] Inventors: Daniel K. Negus, La Honda; Bernard J. Couillaud, Palo Alto, both of Calif.

[73] Assignee: Coherent, Inc., Palo Alto, Calif.

[21] Appl. No.: 665,469

[22] Filed: Mar. 6, 1991

Related U.S. Application Data

[62] Division of Ser. No. 361,395, Jun. 5, 1989, Pat. No. 5,038,360.

[51] Int. Cl.⁵ .............................................. H01S 3/10
[52] U.S. Cl. ...................................... 372/20; 359/500; 372/105
[58] Field of Search ................ 372/20, 105; 359/500, 359/499

[56] References Cited

U.S. PATENT DOCUMENTS

| | | | |
|---|---|---|---|
| 2,607,272 | 8/1952 | Bond | 359/500 |
| 3,663,089 | 5/1972 | Makas | 359/500 |
| 4,914,664 | 3/1990 | Woodward | 372/20 |

*Primary Examiner*—James W. Davie
*Attorney, Agent, or Firm*—Limbach & Limbach

[57] ABSTRACT

A birefringent filter ("BRF") unit, for use in the cavity of a tunable pulsed laser generating ultrashort pulses, including means for suppressing satellite pulses resulting from surface reflections. In one preferred embodiment, the inventive BRF has substantially parallel front and back surfaces, and is cut so that its optical axis is not parallel to its front surface. For example, the inventive BRF may be a quartz crystal having a thickness of 3 mm, with its optical axis oriented at an angle substantially equal to 50 degrees from the plane of its front surface. In a second preferred embodiment, the inventive BRF includes a relatively thick, non-birefringent component coupled with index matching material to a relatively thin birefringent component. In a third preferred embodiment, the inventive BRF includes a pair of thick birefringent components designed so that the ordinary ray of the first component becomes the extraordinary ray of the second component. In this third embodiment, the two components preferably have substantially equal birefringence N, and differ in thickness by an amount W chosen so that the overall optical phase shift induced by the inventive BRF is substantially equal to the optical phase shift induced by a conventional single-component BRF having thickness W and birefringence N.

16 Claims, 1 Drawing Sheet

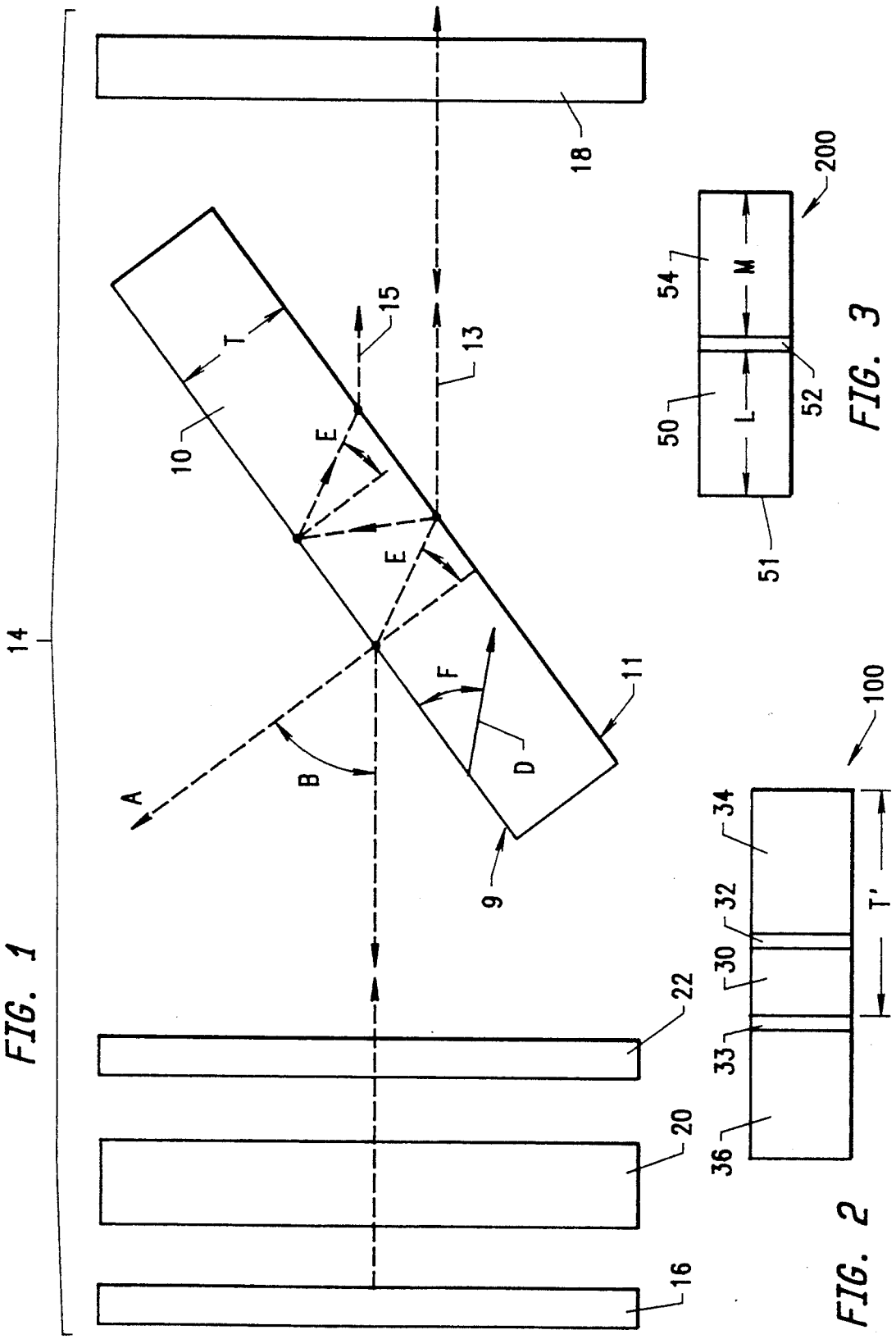

BIREFRINGENT FILTER FOR USE IN A TUNABLE PULSED LASER CAVITY

This is a divisional of application Ser. No. 07/361,395, filed Jun. 5, 1989, now U.S. Pat. No. 5,038,360.

FIELD OF THE INVENTION

The invention relates to birefringent filters for use in tunable pulsed lasers. More particularly, the invention is a birefringent filter for use in a tunable pulsed laser, permitting a broad oscillation frequency bandwidth while suppressing satellite pulses resulting from reflections from the birefringent filter's surfaces.

BACKGROUND OF THE INVENTION

It is conventional to employ a birefringent filter (sometimes denoted hereinafter as a "BRF") as a tuning element in a laser cavity. For example, U.S. Pat. No. 3,868,592, issued Feb. 25, 1975 to Yarborough, et al., teaches positioning a BRF in a laser cavity with the BRF's front surface oriented at the Brewster angle with respect to the incident laser beam. The BRF, so oriented, is intended to transmit only a selected primary frequency component of the laser beam (although, in practice, other frequency components may also undesirably be transmitted through secondary transmission sidebands). In order to tune the laser beam's frequency (i.e., to shift the frequency of the peak of the filter transmission function), the BRF is rotated about the axis perpendicular to its front surface. U.S. Pat. No. 3,868,592 teaches that several "Brewster angle oriented" BRFs can be stacked together, in order to narrow the frequency width of the filter while maintaining sufficient separation between the successive orders of the filter to prevent oscillation at more than one frequency.

In order to improve the amplitude ratio between the primary and secondary sidebands of a BRF assembly, it has been proposed that additional Brewster surfaces be added by stacking several "Brewster angle oriented" glass plates with one or more "Brewster angle oriented" BRFs. For example, see: Holtom, et al., "Design of a Birefringent Filter for High-Power Dye Lasers," IEEE J. of Quantum Electronics, V. QE-10, No. 8, pp. 577-579 (1974); and Hodgkinson, et al., "Birefringent Filters for Tuning Flashlamp-Pumped Dye Lasers: Simplified Theory and Design," Applied Optics, V. 17, No. 12, pp. 1944-1948 (1978).

However, we have recognized that when a conventional BRF assembly is positioned in the cavity of a pulsed laser, reflections of the laser beam from the front and rear surfaces of the assembly components result in undesirable "satellite" pulses. Such satellite pulses have the same (or similar) frequency content as does the desired primary laser pulse, but are delayed relative to the primary pulse by integral multiples of the quantity $t = 2(T/c)(n_{eff}/\cosine E)$, where T is the optical component thickness, $n_{eff}$ is the optical component's effective refractive index, E is the internal angle between the propagation ray and the normal to the component's surface, and c is the speed of light in a vacuum, in the case that the primary pulse width is less than the round trip travel time of the beam in the optical component.

The parasitic satellite pulse problem arises where conventional assemblies of thin BRFs are used in tunable lasers for producing very short laser output pulses. To permit generation of very short output pulses, a BRF assembly must have a broad oscillation frequency bandwidth. In order to achieve this broad spectral width characteristic, conventional BRF assemblies have employed thin birefringent components and thus have been subject to the parasitic satellite pulse problem.

We have recognized that the parasitic satellite pulse problem exists even where an attempt is made to orient conventional BRF assemblies at the Brewster angle. Thus, where the conventional "Brewster angle oriented" BRF assembly is a conventional stack (including one or more thin BRFs and one or more glass plates), reflections from "Brewster" surfaces will result in undesirable satellite pulses.

Until the present invention, problem of undesired satellite pulses in tunable lasers for producing short output pulses had neither been appreciated nor solved. The present invention solves the satellite pulse problem in tunable lasers by employing an optically thick BRF assembly having a broad oscillation frequency bandwidth. The inventive BRF assembly permits generation of ultrashort pulses with a tunable laser, without undesired parasitic satellite pulses.

SUMMARY OF THE INVENTION

The invention is a birefringent filter assembly (sometimes referred to herein as a "BRF") for use in the cavity of a tunable pulsed laser producing ultrashort tunable pulses. In all embodiments, the inventive BRF includes a means for suppressing satellite pulses resulting from reflections from the BRF's surfaces (i.e., means for suppressing satellite pulses resulting from "surface reflections").

In one preferred embodiment, the inventive BRF has substantially parallel front and back surfaces, and is cut so that its optical axis is not parallel to its front surface. For example, the inventive BRF may be a quartz crystal having a thickness of 3 mm, with its optical axis oriented at an angle substantially equal to 50 degrees from the plane of its front surface.

In a second preferred embodiment, the inventive BRF includes a thick, non-birefringent component coupled with index matching material to a relatively thinner birefringent component, or a thinner birefringent component sandwiched between two relatively thicker non-birefringent components.

In a third preferred embodiment, the inventive BRF includes a pair of birefringent components with thicknesses and relative optical orientation chosen so that the ordinary ray of the first component becomes the extraordinary ray of the second component. In the third embodiment, the two components preferably have the same birefringence, and difference between their thicknesses is preferably equal to the thickness of an equivalent single-component BRF having the same birefringence.

BRIEF DESCRIPTION OF THE DRAWINGS

FIG. 1 is a simplified, side cross-sectional view of a pulsed laser including a first preferred embodiment of the inventive birefringent filter.

FIG. 2 is a side cross-sectional view of a second preferred embodiment of the invention.

FIG. 3 is a side cross-sectional view of a third preferred embodiment of the invention.

Detailed Description of the Preferred Embodiments

FIG. 1 is a simplified, side cross-sectional view of a tunable pulsed laser (identified by referenced numeral 14). A preferred embodiment of the inventive BRF is positioned in the laser's optical resonator cavity. The optical resonator cavity of pulsed laser 14 includes mirror 16, partially transmissive mirror 18, gain medium 20, and mode-locking device 22. Mirror 16 preferably has maximal reflectivity at the laser wavelength. Mirror 18 preferably has high reflectivity, but is capable of transmitting a relatively small fraction of the laser radiation incident thereon. The laser output beam pulses propagate out (toward the right in FIG. 1) from the optical resonator cavity through mirror 18. Mode-locking device 22 may be of any conventional type, such as a saturable absorber.

BRF 10 is mounted within the resonator cavity along the laser beam path, for tuning the output frequency of laser 14 (i.e., for selecting an oscillating frequency bandwidth of radiation propagating in the resonator cavity). In FIG. 1, the laser beam path is horizontal. Front surface 9 and back surface 11 of BRF 10 are substantially parallel. The angle, B, between the normal (A) to BRF 10's front surface 9 and the direction of the radiation incident on surface 9, is preferably the Brewster angle. Of course, in the FIG. 1 system, the angle between the normal to BRF 10's back surface 11 and the radiation incident on surface 11 has the same magnitude as angle B.

The output beam frequency may be tuned by rotating BRF 10 about axis A, which axis is perpendicular to surface 9. As BRF 10 rotates about axis A, its front surface 9 remains oriented at angle B (preferably, the Brewster angle) with respect to the laser radiation propagating horizontally between resonator mirrors 16 and 18.

BRF 10 preferably is a piece of crystalline quartz (in contrast with a piece of fused quartz) of the type absorbing as little light as possible. Typically, commercially available synthetic crystalline quartz will absorb less light than will natural crystalline quartz.

BRF 10's thickness (the distance T in FIG. 1), birefringence (the difference, denoted herein as N, between the BRF's ordinary and extraordinary refractive indices, which are associated with the BRF's fast and slow axes respectively), and the angle between the incidence plane and the plane containing the crystalline optic axis and the internally refracted beam ray, determine the overall polarization rotation that BRF 10 will induce in incident radiation.

It is contemplated that the pulsed output beam from laser 14 will consist of a series of pulses. To generate pulses having duration on the order of a picosecond or less, an effective intracavity bandwidth of on the order of 10 cm$^{-1}$ is required. With a conventional intracavity BRF (having its optical axis parallel to its front surface, and having typical birefringence), this intracavity bandwidth requirement will be satisfied only if the thickness, T, of such conventional BRF is in the range from about 350 to 400 microns or less.

In practice, we have found that some radiation reflects from the surfaces of an intracavity BRF, even when it is oriented at the Brewster angle. With a conventional, thin (400 micron) intracavity BRF, the beam separation in a picosecond (or sub-picosecond) pulsed laser resulting from walkoff at the Brewster angle between the main beam and the undesired subsequent reflections is only about 75 microns. This separation is insufficient to prevent subsequent reflected beams from propagating simultaneously and colinearly in the laser cavity. In this case, if the primary laser pulse has shorter duration than the round trip travel time in the BRF, one or more undesired "satellite" pulses (such as the pulse associated with secondary ray 15) will be emitted from the resonator cavity in addition to each primary laser pulse (such as the pulse associated with primary ray 13). The satellite pulses occur with frequency equal to the inverse round trip travel time in the BRF, so that the time between emission of successive satellite pulses will be $t = 2(T/c)(n_{eff}/\cosine E)$, where T is the BRF thickness, $n_{eff}$ is the BRF's effective refractive index, E is the internal angle between the propagation ray and the normal to the BRF surface, and c is the speed of light in a vacuum.

In principle, the parasitic satellite pulse problem could be eliminated by employing an extremely thin BRF (i.e., from 30 to 50 microns, depending on the effective refractive index), with an extremely high birefringence (i.e., 0.1). Such a high birefringence is an order of magnitude greater than the birefringence of crystalline quartz (0.01). With such an extremely thin BRF, the satellite pulses would occur sufficiently close in time to the primary pulse (i.e., within 30-40 fs) so that they are indistinguishable from the primary pulse for most practical purposes.

However, we have developed three different solutions to the parasitic satellite pulse problem. We prefer any of these three solutions to use of an extremely thin BRF as described in the previous paragraph.

Intracavity BRF 10 of FIG. 1 represents a first preferred embodiment of the invention. BRF 10 has its optical axis D oriented at an angle F (greater than zero degrees) from the plane of its front surface 9. By cutting BRF 10 with such an "inclined" optical axis D, the thickness T of BRF 10 may be much greater than the thickness of a conventional intracavity BRF (having optical axis parallel to its front surface) providing the same overall polarization rotation as does the inventive BRF 10. For example, if BRF 10 is a quartz crystal oriented at the Brewster angle in the resonator cavity, BRF 10 may have a thickness T substantially equal to 3 mm if the optical axis D of BRF 10 is oriented at an angle F substantially equal to 50 degrees from the plane of its front surface.

In each variation of the first preferred embodiment, the optical axis inclination angle F and thickness T of BRF 10 should be chosen so that surface reflections from BRF 10 will be sufficiently spatially separated by beam walkoff with respect to the primary laser beam to avoid satellite pulse oscillation within the resonator cavity and emission from the resonator cavity. Consistent with the criterion set forth in the preceding sentence, where the inventive BRF 10 is composed of crystalline quartz and is intended for use with a picosecond (or sub-picosecond) pulsed laser, the thickness T of BRF 10 should be substantially greater than 400 microns (and preferably should be at least several millimeters).

The second preferred embodiment will next be described with reference to FIG. 2. BRF 100 in FIG. 2 may be substituted for BRF 10 in FIG. 1. BRF 100 includes thick, non-birefringent components 34 and 36, and a relatively thinner birefringent component 30. Components 30, 34, and 36 have matching (or nearly matched) refractive indices, and are bonded together with index matching material 32 and 33. Index matching material 32 and 33 preferably has refractive index substantially equal to the average of the ordinary and extraordinary refractive indices of component 30.

In each variation of the FIG. 2 embodiment, the thickness of BRF 100 should be chosen so that surface reflections from BRF 100 will be sufficiently spatially separated by beam walkoff with respect to the primary laser beam to avoid satellite pulse oscillation within the resonator cavity and emission from the resonator cavity in which BRF 100 is to be installed. Consistent with the criterion set forth in the preceding sentence, where component 30 is composed of crystalline quartz and BRF 100 is to be installed in the resonator cavity of a picosecond (or sub-picosecond) pulsed laser, the overall thickness T' of BRF 100 should be substantially greater than 400 microns.

The third preferred embodiment of the invention will next be described with reference to FIG. 3. Inventive BRF 200 (shown in FIG. 3) may be substituted for BRF 10 (shown in FIG. 1). BRF 200 includes a pair of thick birefringent members 50 and 54. Preferably, members 50 and 54 have substantially the same birefringence, N, and (ordinary) refractive index, n. The birefringence, N, is the difference between the ordinary and extraordinary refractive indices of the birefringent members. For example, in a preferred embodiment, members 50 and 54 are cut or formed from identical material, and are bonded together with a thin layer of index matching material 5 (or optically contacted, without such index matching material).

Members 50 and 54 have thicknesses L and M, respectively, and the thickness of layer 52 is negligible relative to both L and M. Thicknesses L and M are chosen (and members 50 and 54 are connected together with appropriate relative optical orientation) so that, when radiation is incident at end surface 51 of component 50, the ordinary ray (at surface 51) of such incident radiation becomes the extraordinary ray (incident at member 54) after the radiation has propagated through member 50 and layer 52. The ordinary axes of members 50 and 54 must be substantially orthogonal in order to achieve the described optical characteristic.

In order for BRF 200 to provide the same overall polarization rotation as a conventional BRF of thickness W and birefringence N, thicknesses L and M should be chosen so that the difference L minus M is equal to W (i.e., so that $L-M=W$). In each variation of the FIG. 3 embodiment, the overall thickness of BRF 200 should be chosen so that surface reflections from BRF 200 will be sufficiently spatially separated with respect to the primary laser beam to avoid satellite pulse oscillation within the resonator cavity in which BRF 200 is to be installed and emission from the resonator cavity in which BRF 200 is to be installed. Consistent with the criterion set forth in the preceding sentence, where members 50 and 54 are composed of crystalline quartz and BRF 200 is to be installed in the resonator cavity of a picosecond (or sub-picosecond) pulsed laser, the overall thickness of BRF 200 (i.e., thickness L plus thickness M plus the thickness of layer 52) should be substantially greater than 400 microns.

Index matching material 52 preferably has refractive index substantially equal to the average of the ordinary and extraordinary indices of members 50 and 54.

As noted above, the composite BRF 200 provides the same overall polarization rotation as a conventional BRF of thickness W (L-M). Similarly, the composite BRF 100 provides the same overall polarization rotation as the intermediate, conventional BRF element 30. Stated differently, and for the more general case, the net birefringence of the composite BRF 100 and 200 is the same as the net birefringence produced by element 30 (for the FIG. 2 embodiment) or a BRF of thickness W (for the FIG. 3 embodiment). Net birefringence is defined as the birefringence per unit length, multiplied by the length of the element.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A tunable laser having a primary laser beam propagating within a resonant cavity comprising:
   a composite birefringent filter positioned in the resonant cavity for selecting an oscillating frequency bandwidth of radiation from the primary laser beam propagating in the resonant cavity, said composite filter including a block of birefringent material, said filter further including a transmissive member optically connected to said block of birefringent material, said transmissive member being configured such that the net birefringence created by the composite filter is less than it would be for a filter composed only of said birefringent material and having an optical thickness equal to the composite filter whereby surface reflections from the composite filter will be sufficiently spatially separated by beam walkoff with respect to the primary laser beam to suppress interference effects within the resonant cavity.

2. A laser as recited in claim 1 further including an index matching material interposed between said block of birefringent material and said transmissive member.

3. A laser as recited in claim 1 wherein said transmissive member is formed from a material which is substantially non-birefringent.

4. A laser as recited in claim 3 wherein the optical thickness of said transmissive material is greater than the thickness of said block of birefringent material.

5. A laser as recited in claim 3 wherein the refractive index of said transmissive member is substantially equal to the ordinary refractive index of the birefringent material.

6. A laser as recited in claim 3 wherein said composite filter further includes a second transmissive member optically connected to said block of birefringent material with said block being interposed between the two transmissive members.

7. A laser as recited in claim 1 wherein said transmissive member is formed from a birefringent material oriented in a manner such that an ordinary ray entering said block of birefringent material will be an extraordinary ray upon entering the transmissive member.

8. A laser as recited in claim 7 wherein the birefringence N of both the block of birefringent material and the transmissive member are the same and the net birefringence of the composite is defined by the difference in thickness between the block of birefringent material and the transmissive element.

9. A tunable laser having a primary laser beam propagating in the resonant cavity comprising:

a composite birefringent filter positioned in the resonant cavity for selecting an oscillating frequency bandwidth of radiation propagating in the resonant cavity, said composite filter including a block of birefringent material, said filter further including a transmissive member optically connected to said block of birefringent material, said transmissive member being configured such that the net birefringence created by the composite filter is not greater than the net birefringence of the birefringent material alone, whereby surface reflections from the composite filter will be sufficiently spatially separated by beam walkoff with respect to the primary laser beam to suppress interference effects within the resonant cavity.

10. A laser as recited in claim 9 further including an index matching material interposed between said block of birefringent material and said transmissive member.

11. A laser as recited in claim 9 wherein said transmissive member is formed from a material which is substantially non-birefringent.

12. A laser as recited in claim 11 wherein the optical thickness of said transmissive material is greater than the thickness of said block of birefringent material.

13. A laser as recited in claim 11 wherein the refractive index of said transmissive member is substantially equal to the ordinary refractive index of the birefringent material.

14. A laser as recited in claim 11 wherein said composite filter further includes a second transmissive member optically connected to said block of birefringent material with said block being interposed between the two transmissive members.

15. A laser as recited in claim 9 wherein said transmissive member is formed from a birefringent material oriented in a manner such that an ordinary ray entering said block of birefringent material will be an extraordinary ray upon entering the transmissive member.

16. A laser as recited in claim 15 wherein the birefringence N of both the block of birefringent material and the transmissive member are the same and the net birefringence created by the composite is defined by the difference in thickness between the block of birefringent material and the transmissive element.

* * * * *